United States Patent [19]

Hoover, Jr.

[11] 4,268,765
[45] May 19, 1981

[54] TRANSPIRATION COOLED ELECTRODES AND INSULATORS FOR MHD GENERATORS

[75] Inventor: Delmer Q. Hoover, Jr., Churchill Boro, Pa.

[73] Assignee: Westinghouse Electric Corp., Pittsburgh, Pa.

[21] Appl. No.: 16,266

[22] Filed: Feb. 28, 1979

[51] Int. Cl.³ ............................................... H02N 4/02
[52] U.S. Cl. ...................................................... 310/11
[58] Field of Search .......................................... 310/11

[56] References Cited

U.S. PATENT DOCUMENTS

| | | | |
|---|---|---|---|
| 3,214,615 | 10/1965 | Way | 310/11 |
| 3,259,767 | 7/1966 | Way et al. | 310/11 |
| 3,271,597 | 9/1966 | Way | 310/11 |
| 3,275,860 | 9/1966 | Way | 310/11 |
| 3,309,545 | 3/1967 | Emmerich | 310/11 |
| 3,553,502 | 1/1971 | Kasahara et al. | 310/11 |

*Primary Examiner*—Donovan F. Duggan
*Attorney, Agent, or Firm*—Edward L. Levine

[57] ABSTRACT

Systems for cooling the inner duct walls in a magnetohydrodynamic (MHD) generator. The inner face components, adjacent the plasma, are formed of a porous material known as a transpiration material. Selected cooling gases are transpired through the duct walls, including electrically insulating and electrode segments, and into the plasma. A wide variety of structural materials and coolant gases at selected temperatures and pressures can be utilized and the gases can be drawn from the generation system compressor, the surrounding environment, and combustion and seed treatment products otherwise discharged, among many other sources. The conduits conducting the cooling gas are electrically insulated through low pressure bushings and connectors so as to electrically isolate the generator duct from the ground.

11 Claims, 3 Drawing Figures

TRANSPIRATION COOLED ELECTRODES AND INSULATORS FOR MHD GENERATORS

GOVERNMENT CONTRACT

This invention was made or conceived in the course of, or under, a contract with the United States Department of Energy identified as No. EF-77-C-01-2363.

BACKGROUND OF THE INVENTION

1. Field of the Invention

This invention relates to MHD generation systems and more particularly to method and apparatus for cooling and protecting the inner duct electrode and insulation wall surfaces utilizing transpiration cooling.

2. Description of the Prior Art

The environment created within a magnetohydrodynamic (MHD) generator duct can be described as hostile. Materials, typically including a fuel such as particulate coal, an oxidant such as air and an ionizing conductor or seed such as potassium are reacted in a combustor to create high temperature reaction products, referred to herein as a plasma. The plasma, typically including excess fuel, coal slag and sulfur at a temperature in the rane of 2500° K., is passed over the inner wall surfaces of the generator duct at a velocity in the range of 1000 meters per second.

The duct wall surfaces, which can include electrodes, electrically conducting wall segments and electrically insulating wall segments, when exposed to these hostile conditions, tend to erode, corrode, evaporate or otherwide deteriorate. One prior art response to the deterioration has typically been to utilize high pressure water cooled metal structures to cool the wall surfaces. Ceramic spacers used as electrical insulation are cooled by conduction through intimate contact with the water-cooled metal. Ceramic coatings have also been provided to buffer the metal surfaces from the plasma.

It appears further to have been universally accepted that, in order to avoid excessive erosion of the inner wall surfaces, particularly the electrode walls, the water-cooled wall surface temperatures should be maintained below the freezing point of the seed/slag mixture so that some of this material will freeze onto the surfaces as a protective layer. However, while prior teachings have claimed that this layer protects the metal or ceramic wall surfaces from the hostile plasma, it appears to react with the surfaces by a process which is at least partially electrochemical. To deal with these reactions there is a tendency to further reduce the surface temperatures, through water cooling, which results in severe material limitations, high electrical resistance of the slag layer, and apparently such high electrical resistance at the slag layer-electrode inner face that detrimental arcing and hot spots result. Additionally, this slag layer provides an undesirable path for current leakage across ceramic insulators which results in lower system efficiency and breakdown of the insulators.

If a slag layer is desired as a protective surface, the combustor must provide some slag carryover into the duct to a degree higher than otherwise would be necessary. This excess slag increases the stack gas cleanup requirements to maintain acceptably low seed material loss and particulate emission from the plant and combines with the seed, making seed separation from collected material difficult. The seed-slag combination also forms very hard and tenacious deposits on component surfaces downstream of the duct, such as heat exchanger tubes, thereby decreasing system efficiency and increasing maintenance concerns.

Conductive water cooling provides additional concerns. The material for conducting heat to the water is severely limited, and copper appears to be the only material with adequate thermal diffusivity to prevent localized electrical arcs. Copper, however, dissolves into demineralized water at the operating temperatures. With or without deionization of the water, it is difficult to maintain the water as an electrical non-conductor, which must be maintained to avoid efficiency losses, and it is further difficult to design and fabricate structures and conduit paths for the water, typically at high pressures, which themselves are insulating and thus not a drain on overall system efficiency.

It is therefore desirable to provide an MHD system which overcomes the difficulties associated with water cooling. It is further desirable to alleviate the concerns associated with excessive slag carryover and buildup.

SUMMARY OF THE INVENTION

This invention provides a desirable alternative to water cooling systems for components making up the inner wall surfaces of an MHD generator duct. The invention further provides for alleviation of the need for a substantial protective slag layer on the inner wall surfaces.

The invention takes advantage of the technology developed for cooling of gas turbine blades and vanes referred to as "transpiration cooling". In transpiration cooling a coolant, being a gas as used in the invention, passes through a fine porous structure. The fine passages provide a very high ratio of heat transfer area to coolant flow rate and almost perfect counterflow between the heat and the coolant.

The technology, in accordance with the invention, is applied to the components making up the inner wall, adjacent the hostile plasma, in the duct of an MHD generator. Typical duct wall components include segments of electrodes, conducting wall segments, and insulated segments. These segments are made of a transpiring material and a gaseous coolant is supplied which transpires through the component, providing substantial cooling, and into the plasma.

The type and source of gas can be varied in accordance with the specific overall system design and operating parameters. The coolant gases can include, but are not limited to, air, oxygen, nitrogen, argon, water vapor, carbon dioxide, metal and metal oxide vapors, exhaust products, and other gases compatible with the particular construction material of the segments. Illustrative of the latter is the use of diluted magnesia (MgO) gas in conjunction with a magnesia wall segment. Air or oxygen can be drawn from, or downstream of, the compressor providing the air to the combustor where the plasma is formed. Air can also be drawn or induced into the segments at the exit end of the duct where pressures are typically sub-atmospheric, merely by providing a conduit between the atmosphere surrounding the generator and the transpiring wall segment. Nitrogen rich gases can be drawn from the oxygen plate of a seed recovery treatment plant, or from an oxygen plant which provides oxygen for combustion, if either are utilized in the generation system, thereby utilizing nitrogen rich gases otherwise discharged as waste by-products. Additionally, combustion products from upstream, fuel rich, or downstream, fuel lean, of an $NO_x$ air injection port can be used, with appropriate processing, to provide a reducing or mildly oxidizing transpiration gas.

The coolant gases can additionally be provided at different temperatures and pressures from different sources for injection at various segments along the duct. For example, a high pressure air can be tapped from the compressor for utilization at the entry end of the duct and the lower pressure atmosphere drawn into the downstream segments. Various combinations of gases can also be utilized, such as use of oxygen at the electrode segments and nitrogen at the insulating side wall segments.

The transpiration cooling not only alleviates the need for, and the detrimental effects of, a protective slag layer, but also helps in avoiding formation of the layer, since it is injected substantially perpendicular to the plasma flow and tends to "blow away" the slag particles. Further, a boundary layer of coolant gas is formed which tends to maintain separation of the slag and the segments. And, the amount of slag removed from the combustor, prior to entry of the plasma into the duct, can be substantially increased through technology well established in the art.

It will also be apparent that the cooling gas utilized, as well as the conduits used to transport the gas, can readily be maintained non-conductive or insulated from the duct segments as compared to prior art watercooled systems which require more stringent structural designs, higher pressures, in the range of 2000 to 4500 psia, and which are more prone to becoming electrically conductive.

The systems accordingly provide a great deal of flexibility in materials selection and component design, increased reliability and longevity, and alleviate problems associated with water cooling.

BRIEF DESCRIPTION OF THE DRAWINGS

The advantages, nature and additional features of the invention will become more apparent from the following description, taken in connection with the accompanying drawings, in which.

DESCRIPTION OF THE PREFERRED EMBODIMENTS

Figure 1:
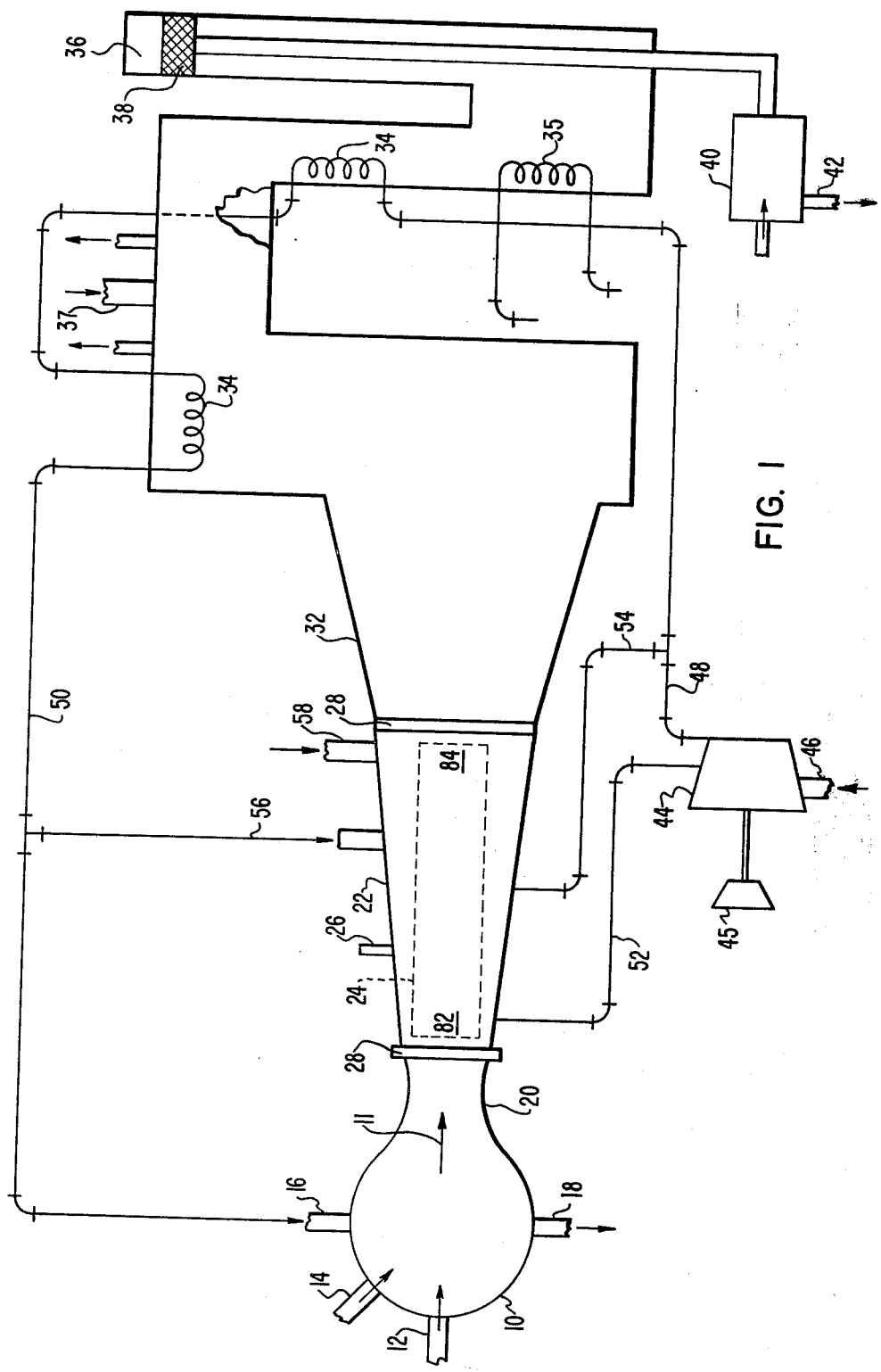
FIG. 1 is a schematic view of a MHD generation system in accordance with the invention.

Referring now to FIG. 1 there is shown a magnetohydrodynamic (MHD) generation system in accordance with the invention. The system includes a combustor 10 within which are mixed reactants to form a high temperature plasma 11. A fuel, such as pulverized coal, enters the combustor through a conduit 12; an ionizing seed, such as potassium or cesium in a combining form such as $K_2SO_4$ or $CS_2CO_3$, enters through conduit 14; and an oxidant, such as air or oxygen, enters through conduit 16. A portion of the slag formed by the combustion reaction is removed from the combustor 10, by means well known in the art, through conduit 18.

The plasma formed in the combustor 10 flows through a nozzle region 20 and enters the main duct 22. Passage of the ionized plasma through the field created by magnets, represented by the dotted line 24, creates a current flow through electrodes along the duct inner wall which is discharged from the duct through a main lead 26. The entire duct 22 is electrically insulated from its adjacent components such as by insulation 28. The temperature and particularly the pressure of the plasma drops substantially upon passage through the duct from, for example, 2500° K. and 90 psia to 2100° K. and subatmospheric pressure. The plasma velocity head is then converted to pressure in a diffuser 32, passes across air preheaters 34 and steam generators 35, and is discharged through an outlet 36. An air injection port 37 is also utilized for nitrous oxides emission control. Particulate removal means, such as a precipitator 38 and/or sulfur compound removal means, such as a scrubber, ensure high efficiency seed recovery and proper conditions for atmospheric discharge for further utilization. Seed and slag removed in the precipitator 38 can be treated to recover the seed in a seed treatment apparatus 40, well known in the art, which typically discharges a waste gas enriched in nitrogen through a conduit 42.

Additionally shown in FIG. 1 is a compressor 44 and drive 45 for compressing an oxidant such as air or oxygen from a source 46 which, in the case of air, can merely be the surrounding environment. Oxygen can be provided by a separate oxygen plant at adequate pressure. The oxidant is directed through conduit 48, through the preheaters 34, and through conduits 50 and 16 to the combustor 10.

The foregoing discussion will provide a better background understanding of the invention. The function of the exemplary conduits 52 through 58 shown in FIG. 1 will become apparent from the following.

Figure 2:
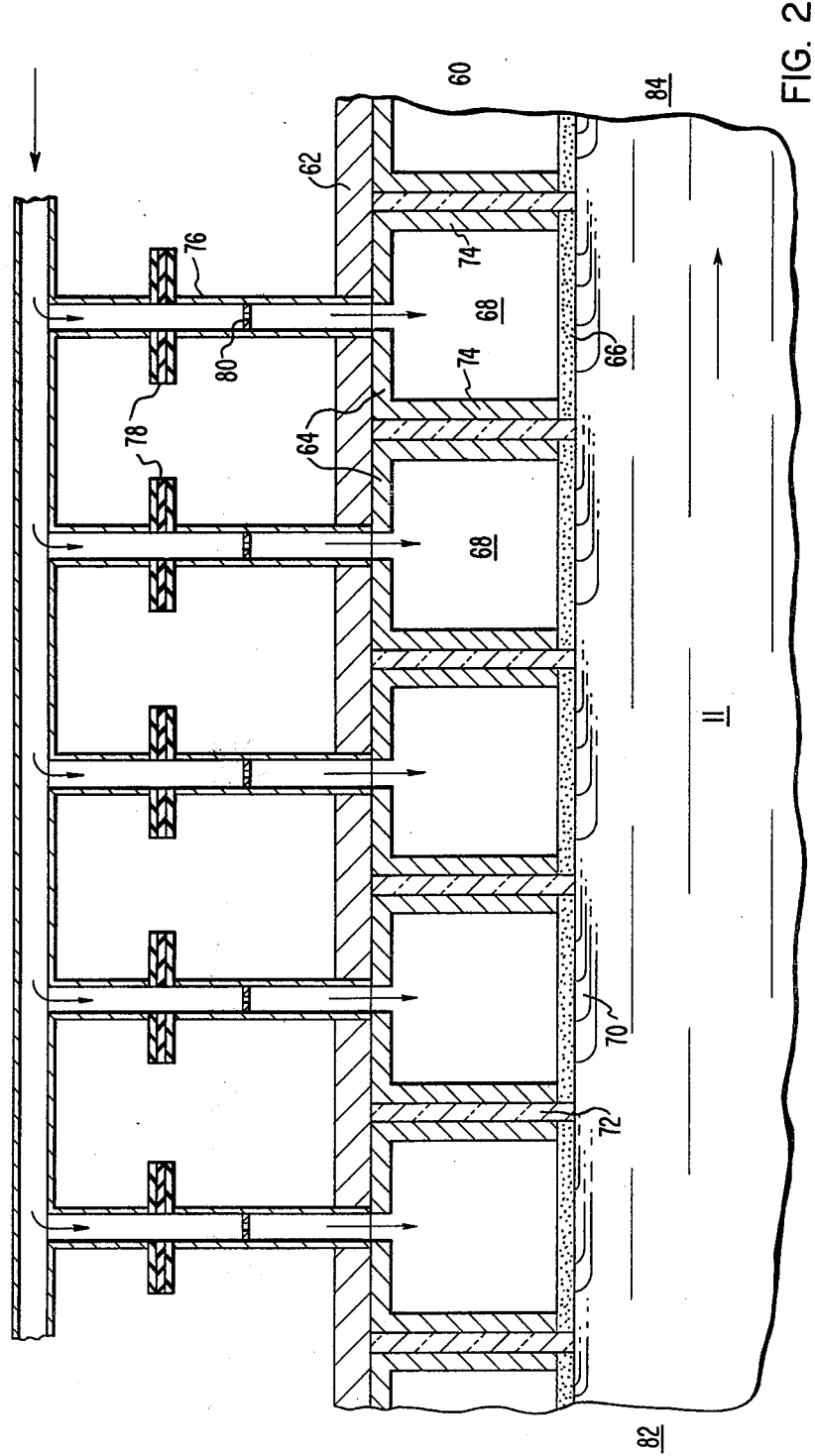
FIG. 2 is a cross sectional view of a duct wall in an MHD generator in accordance with the invention.

The duct 22 is comprised of inner walls which include insulated segments and electrode segments. Referring to FIG. 2 there is shown an electrically insulating segmented wall 60, commonly referred to as a peg wall for water-cooled ducts. It includes a structural support 62 to which is mounted a plurality of transpiration members 64. The transpiration members each include an inner face 66, forming part of the duct inner wall, which is made of a transpiration material porous to a selected gaseous coolant. Exemplary transpiration materials include Lamilloy, developed and tested by the Detroit Diesel Allison Division of General Motors Corporation for aviation gas turbine utilization, and a woven wire developed and tested by the Curtis Wright Corporation for gas turbine application. Lamilloy comprises multiple layers of foil, one surface of each layer being etched with very fine flow passages thus providing a high heat transfer area to mass flow ratio. The etched passages connect very fine holes in each layer which provide for flow of a coolant among layers and through the surface. The woven wire has been woven into shells, sintered, and electron beam welded to a strut to form an air foil surface. The porosity of a given shell can be varied, as can be the structural integrity and overall porosity of a plurality of layered shells. Additional transpiration materials which can advantageously be utilized in accordance with the invention include porous ceramics and sintered metal powders, among others.

A coolant gas enters the transpiration member 64 which forms a generally enclosed compartment 68, passes through the porous inner face 66, thereby cooling the face 66, and is discharged into the flowing plasma. The coolant gas forms a boundary layer 70 along the inner wall, which tends to prevent any buildup of seed and slag along the wall which typically occurs only by diffusion of gases or Brownian motion of particles or drops due to divergence of the walls in the direction of flow. Between the boundary layer and the plasma main stream is additionally formed a mixing region 73. Disposed between the transpiration members 64 are insulator spacers 72. Side members 74 of the transpiration members 64 can also be comprised of a transpiration member to cool the spacers 72, particularly where the spacers are comprised of a porous ceramic. Alternatively, the spacers 72 can be cooled by conduction to side members 74 and will be shielded from the hot gases by the boundary layer from the upstream inner face 66.

The gaseous coolant enters the compartments 68 through conduits 76. To maintain the duct 22 electrically isolated, conduit insulators 78 are utilized. Since the cooling gas is provided at relatively low pressures, in the range of 10 to 300 psia, the conduits and insulators need only be designed for low pressure. The coolant flow path also includes means for controlling the pressure and flow rate of the coolant into the compartments 68 such as orifices 80 disposed in the conduits 76. As the pressure of the plasma within the duct 22 drops substantially along the duct, the pressure of coolant gas injected into the compartments 68 can accordingly be adjusted dependent upon location along the duct length, being higher at the entry end 82 and lower at the exit end 84 (FIG. 1). This can be accomplished not only by the orifices 80, but also by varying the source of the coolant gas.

For example, as shown in FIG. 1, air or oxygen drawn directly from the compressor 44 can be injected through conduit 52 to the upstream transpiration members 64, and lower pressure coolant from bleed ports in the compressor 44 injected through conduit 54 to downstream members 64. Additionally, as the pressure of the plasma at the exit end 84 of the duct is generally subatmospheric, the conduit 58, merely being open at one end to the surrounding atmospheric environment, will provide a path whereby air is induced into the downstream transpiration members 64. To ensure temperature compatibility, this air can be preheated by passing it through conduits in heat exchange relation with the plasma, downstream products, or any other heat source.

The pressure of the injected coolant is, at any location, higher than the internal duct static pressure at the face 66 of the transpiration member. It is noted that, for a given system configuration, a higher pressure coolant injection results in higher coolant flow rates and lower structure temperatures, but that the work required to achieve the higher flow rate at a given high pressure, and the performance degradation caused by mixing, detracts somewhat from the overall system efficiency.

In addition to pressure control, it can additionally be desirable to adjust the temperature of coolant gas injected as a function of position along the duct length, as well as a function of the specific components to be cooled. A higher temperature coolant can be drawn, for example, from conduit 50 downstream of the preheaters 34 and through conduit 56 into the transpiration members 64. A higher temperature coolant is thermodynamically preferable and thus the highest temperature that provides adequate structural integrity should be used. For example, if the transpiration member is a ceramic which exhibits good strength at the plasma temperature, but tends to react with the plasma, the transpiring gas flow may be utilized primarily to protect the material from the hostile plasma, with cooling being a secondary effect.

The flow rates of the cooling gas will be in proportion to the duct internal surface area, which is dependent upon the overall plant rating, and other specifically selected design parameters. The total flow rates preferably are in the range of two to ten percent of the plasma flow rate, or approximately 20 to 150 lb./sec. for a plant rated at approximately 1000 megawatts-electrical. The injection pressures are preferably slightly above, for example, 10 psi, the duct internal pressure at any given location.

Figure 3:
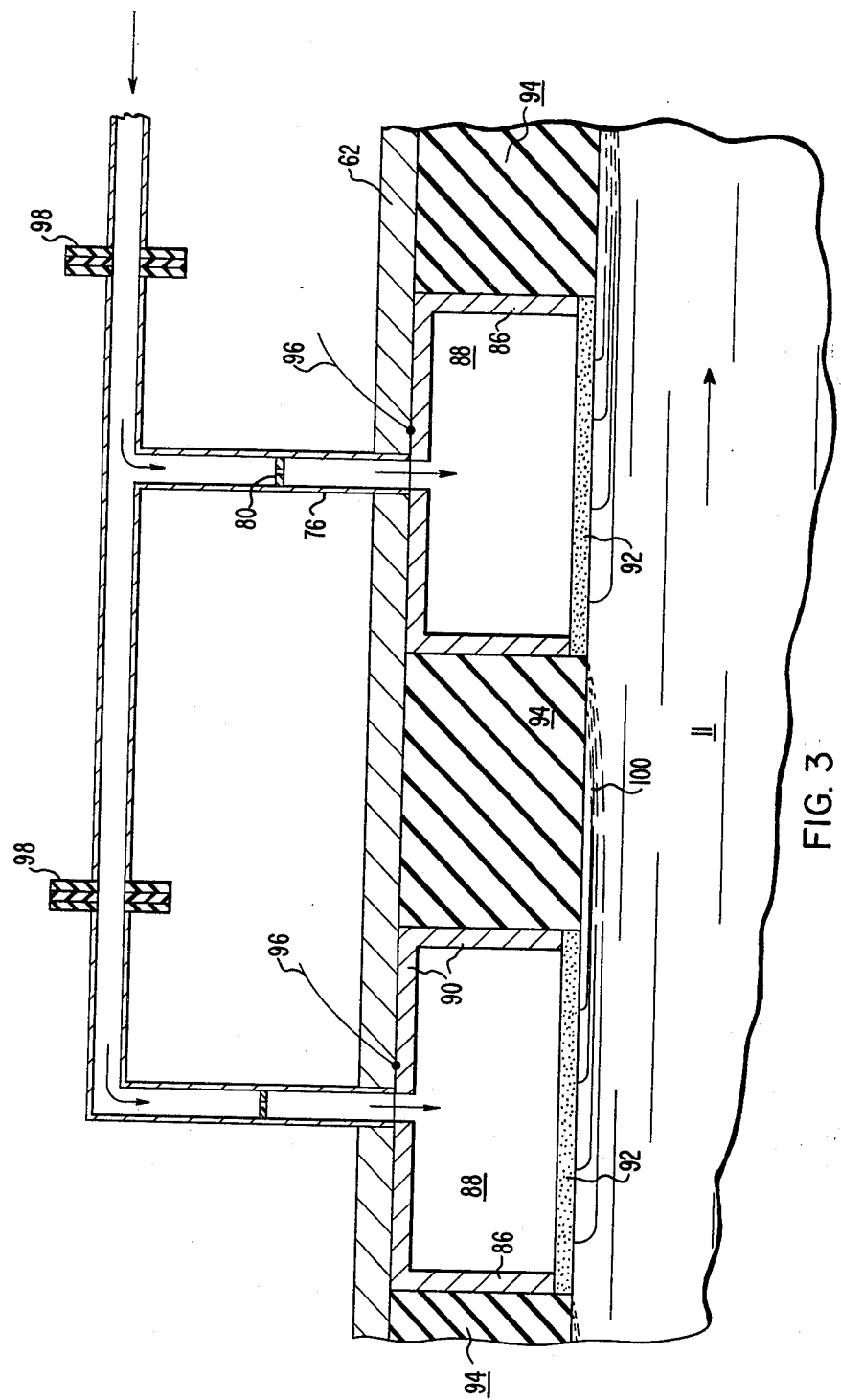
FIG. 3 is a cross sectional view of an electrode wall forming a duct in an MHD generator in accordance with the invention.

FIG. 3 illustrates a segmented duct wall utilizing transpiration cooled electrodes 86. A compartment 88 is formed by preferably metallic plates 90 and a bonded transpiration surface 92. The electrodes 86 are segmented to alleviate Hall currents and are electrically isolated by uncooled interelectrode electrical insulators 94. The interelectrode insulators can additionally be transpiration cooled. Current is conducted from the transpiration surface 92, through the metallic plates to a lead 96 and to the main lead 26. The duct wall of electrodes is electrically isolated by insulating bushings 98. The coolant not only cools and protects the electrode inner duct surfaces 92, but also, due to the transverse flow with respect to the plasma, forms a layer 100 of coolant along the wall surface which additionally protects the insulator 94. It is noted that the insulators 94 can be additionally cooled by conductive water cooling although such is deemed unnecessary and undesirable.

Many additional alternative configurations and materials can be utilized consistent with the invention. For example, although the exemplary foil and weave metallic members, primarily stainless steel and nickel-chrome alloys, have been proposed for jet engine applications, porous ceramics providing sufficient transpiration effects may beneficially be utilized in the MHD generator systems disclosed. Ceramics such as zirconia ($ZrO_2$), magnesia (MgO) and zirconium diboride ($ZrB_2$), among others, are capable of reliable operation at temperatures above those in the plasma in the proper environment. Thus, a relatively small cooling gas flow is required if the proper cooling gas is utilized. For example, magnesia vapor diluted with air can be utilized as the transpiration coolant for a magnesia insulator, a reducing gas, such as rich combustion products or hydrogen as the coolant for a zirconium diboride conductor, or an oxidizing gas for a zirconia surface. A reducing gas can also be beneficial as a coolant for a metallic member.

In addition to use of an oxidant such as air or oxygen as a coolant as illustrated in FIG. 1, coolants not containing, or depleted in oxygen, can also be advantageously utilized such as nitrogen, combustion products or argon. Nitrogen is particularly attractive in those generation systems where seed recovery apparatus 40 discharges a nitrogen rich stream as a waste by-product, or where an oxygen plant 46 provides oxygen to the combustor and similarly discharges a nitrogen rich gas. Other candidate coolant gases include, but are not limited to, water vapor, carbon dioxide, metal vapors such as cesium or potassium, and exhaust products.

In order to have proper environmental controls, the plasma entering the generator duct 22 typically contains an excess of fuel in the form of evolved gases. The excess fuel is necessary for control of nitrous oxides ($NO_x$). If a gas containing oxygen is used as the coolant, the transpiration surface will be exposed to an oxidizing atmosphere and a chemical reaction will occur where the coolant mixes with the fuel rich stream. The temperatures at the inner duct transpiration face and the mixing zone can be set at acceptably low levels by an appropriate choice of coolant gas injection temperature to compensate for this reaction. The reaction will provide some nonequilibrium ionization which enhances gas conductivity at the mixing area. Thus, an oxygen containing cooling gas for the electrode wall can enhance generation efficiency. Alternatively, an inert gas such as carbon dioxide or nitrogen would be preferred at the insulator wall segments to avoid the conductivity effects from non-equilibrium ionization. Thus, different coolant gases can be utilized in the same duct, for example, air at the electrodes and nitrogen at the insulators. It will also be noted that use of an inert or reducing cooling gas allows a substantial flexibility in material selection as compared to air or any coolant containing oxygen. It should also be noted that dependent upon startup procedures, there is a possibility that gaseous fuel could back flush through the transpiration surfaces and subsequently undesirably react with an oxygen containing coolant within the wall segments. To prevent such detrimental reaction, fuel should be adequately purged from the duct prior to injection of an oxygen containing coolant. For example, an inert gas such as nitrogen or argon could be utilized prior to air injection, or the transpiration by air started prior to any fuel entering the duct. These procedures would ensure that any reactions between oxygen and fuel would take place within the duct and not within the duct walls.

The beneficial utilization of transpiration cooling can also be realized at other locations in the generation system such as in the diffuser region walls or particularly in the nozzle region 20 where the highest temperatures are realized. For example, gas from the compressor outlet (FIG. 1) could be transpired into the nozzle region.

The substantial advantages offered by the disclosed systems will now be apparent to those skilled in the art. The systems permit a wide choice of materials. As a result of the short thermal conduction paths through the transpiration material, thermal diffusivity is not a controlling factor and, the gas layer formed along the walls provides a protective environment for the duct inner wall face segments. It is also noted that with elimination of the need for a protective slag layer, the inner face temperatures can also be higher than allowed by previous systems and the tendency for arcing at the electrode surfaces will be reduced. Since compatibility with the limitations of water cooling is no longer required, a wider range of materials can be considered.

The elimination of intentional deposition of seed and slag on the inner face surfaces also eliminates undesirable chemical and electrochemical reactions, short circuiting between electrodes and arcing between the electrode and slag layer. The reduced slag carryover into the generator duct also reduces the difficulty of seed treatment, heat exchanger/preheater fouling and particulate removal requirements.

As compared to conductive water cooled systems which continually remove heat from the duct and thus negatively affect efficiency, there is no heat loss from the duct channel, although the disclosed systems do result in some degradation of the plasma heat through mixing. Additionally, it is substantially easier to reliably electrically insulate the generator duct from the ground and the electrodes from one another as compared to watercooled copper blocks. The electrical resistivity of a once-through transpiration cooling gas and its conduit system is easier to maintain than in a recirculating water system. The systems also provide for a high degree of compatibility between materials and coolants. And, while past wall structures have required the capability to contain high pressure water as necessary in order to utilize the heat energy in, for example, a steam bottoming plant, the structural requirements for containment and passage of a gaseous coolant, in the range of 10 to 300 psia, are substantially reduced.

Since numerous changes may be made in the abovedescribed apparatus without departing from the spirit and scope thereof, it is intended that all matter contained in the foregoing shall be interpreted as illustrative and not in a limiting sense.

I claim:

1. An MHD generation system comprising:
   (a) a combustor;
   (b) means for providing an oxidant to said combustor;
   (c) means for providing a fuel to said combustor;
   (d) means for providing a seed material to said combustor;
   (e) a duct for transporting combustion products, selected portions of said duct being formed of electrodes having an enclosed interior compartment and a front transpiration surface one side of which is adjacent said combustion products and another side of which is adjacent said enclosed interior; and
   (f) means for conducting a selected gas to said enclosed interior of said electrode and through said transpiration surface into said duct.

2. A magnetohydrodynamic generation system transporting a plasma through a duct, said duct having electrically insulating wall segments and conducting electrodes for conducting a current from said plasma to apparatus external to said duct, said system comprising:
   said electrodes including a transpiration surface having a side adjacent said plasma, said surface being comprised of a transpiring material;
   a cooling gas source; and
   means for directing said cooling gas from said source to another side of said electrode transpiration surface such that said cooling gas transpires through said electrode transpiration surface and into said plasma.

3. The system of claim 2 wherein said transpiration surface is disposed at the plasma exit end of said duct and said gas directing means comprises a conduit open at one end to the atmosphere about said duct and communicating at the other end with said transpiration surface, said atmosphere being at an atmosphere pressure and said exit end being at a subatmospheric pressure, whereby some of said atmosphere is drawn through said transpiration surface and into said plasma.

4. The system of claim 3 further comprising means for heating said atmosphere prior to said atmosphere being drawn through said transpiration surface.

5. The system of claim 2 wherein said cooling gas comprises metal oxide vapors of a type similar to the material of construction of said electrodes.

6. The system of claim 5 wherein said electrodes are comprised of MgO and said metal oxide vapor is MgO.

7. The system of claim 2 wherein said cooling gas comprises metal vapors.

8. The system of claim 2 further comprising a combustor upstream of said duct, an oxidant, a fuel and an ionizable seed being reacted in said combustor to form said plasma, said system additionally comprising means for recovering a portion of said seed subsequent to passage of said plasma through said duct, said recovery means discharging a product gas having a substantial nitrogen content, said product gas being said cooling gas source.

9. The system of claim 2 wherein said electrodes are disposed at selected locations spaced along the length of said duct and wherein said cooling gas is directed to said electrodes at preselected pressures which vary in accordance with said selected locations.

10. The system of claim 2 wherein said electrodes are disposed at selected locations spaced along the length of said duct and wherein said cooling gas is directed to said electrodes at preselected temperatures which vary in accordance with said selected locations.

11. A magnetohydrodynamic generation system transporting a plasma through a duct, said duct having electrically insulating wall segments and conducting electrode wall segments for conducting a current from said plasma to apparatus external to said duct, said system comprising:

said insulating wall segments including substantially enclosed compartments defining an interior space and having an inner face one side of which is adjacent said interior space and another side of which is adjacent said plasma, said inner face being comprised to a transpiration material having multiple layers of etched and perforated metallic foil defining fine flow passages therethrough;

a cooling gas source; and means for directing said cooling gas from said source to said interior space such said cooling gas transpires through said inner face and into said plasma.

* * * * *